(12) United States Patent
Taglang

(10) Patent No.: US 6,880,831 B2
(45) Date of Patent: Apr. 19, 2005

(54) POWER-ACTUATED LATHE CHUCK

(75) Inventor: Johann Taglang, Medlingen (DE)

(73) Assignee: Rohm GmbH, Sontheim (DE)

( * ) Notice: Subject to any disclaimer, the term of this patent is extended or adjusted under 35 U.S.C. 154(b) by 123 days.

(21) Appl. No.: 10/353,863

(22) Filed: Jan. 29, 2003

(65) Prior Publication Data
US 2003/0164598 A1 Sep. 4, 2003

(30) Foreign Application Priority Data
Jan. 30, 2002 (DE) .......................... 102 03 667

(51) Int. Cl.⁷ ............................................. B23B 31/10
(52) U.S. Cl. ...................... 279/4.05; 279/124; 279/152; 279/154
(58) Field of Search .............................. 279/4.04, 4.05, 279/67, 110, 123, 124, 140, 152, 153, 154; 409/233; 483/20

(56) References Cited

U.S. PATENT DOCUMENTS

| | | | | |
|---|---|---|---|---|
| 2,462,501 A | * | 2/1949 | Hohwart et al. | ............ 279/136 |
| 2,491,611 A | * | 12/1949 | Hohwart et al. | ........... 279/4.05 |
| 2,565,430 A | * | 8/1951 | Hohwart et al. | ........... 279/4.04 |
| 3,759,535 A | * | 9/1973 | Hilgers | ........................ 279/132 |
| 3,814,448 A | * | 6/1974 | Buck | .......................... 279/4.12 |
| 4,270,763 A | * | 6/1981 | Rohm | ......................... 279/123 |
| 4,410,192 A | * | 10/1983 | Nobukawa et al. | ......... 279/121 |
| 4,641,414 A | * | 2/1987 | Hiestand | ...................... 483/20 |
| 4,838,562 A | * | 6/1989 | Akashi | ........................ 279/106 |
| 6,145,850 A | * | 11/2000 | Rehm | ......................... 279/139 |
| 6,410,430 B1 | * | 6/2002 | Lee et al. | .................... 438/664 |
| 6,568,888 B1 | * | 5/2003 | Hangleiter | .................. 409/233 |
| 6,568,889 B1 | * | 5/2003 | Rohm | ........................ 409/233 |

FOREIGN PATENT DOCUMENTS

JP   01321104 A   * 12/1989   ........... B23B/31/16

* cited by examiner

Primary Examiner—Daniel W. Howell
Assistant Examiner—Michael W. Talbot
(74) Attorney, Agent, or Firm—Herbert Dubno; Andrew Wilford

(57) ABSTRACT

A chuck has a chuck body rotatable about a chuck axis, a plurality of holders angularly spaced about and radially displaceable on the body and each formed with an outwardly flared seat centered on a respective seat axis, and an actuator for radially displacing the holders on the body. Respective jaws on the holders each have an inwardly tapered stem complementary to and engaged snugly in the respective seat. Respective locking elements in the holders are each displaceable into a locking position securing the respective stem in the respective seat.

7 Claims, 17 Drawing Sheets

POWER-ACTUATED LATHE CHUCK

FIELD OF THE INVENTION

The present invention relates to a chuck. More particularly this invention concerns a multiple-jaw power-actuated lathe chuck.

BACKGROUND OF THE INVENTION

A standard multiple-jaw lathe chuck has a base that is normally rotated about and centered on the lathe axis and that carries a plurality of angularly spaced supports to each of which is secured a respective jaw. Means is provided to move the supports radially inward to grip a workpiece and outward to release it. The jaws are removable from the supports so that they can be changes if they get damaged or a different workpiece or machining operation demands differently shaped jaws. Normally the jaws are secured in place by simple bolts.

Thus changing jaws can be a fairly difficult job, especially as the jaws can get frozen in place after being subjected to considerable stresses and heat during machining. What is more the mounting formations can deform so that the new jaws do not assume the proper positions relative to each other, which can result in eccentric mounting of the workpiece and offcenter machining.

OBJECTS OF THE INVENTION

It is therefore an object of the present invention to provide an improved chuck.

Another object is the provision of such an improved chuck which overcomes the above-given disadvantages, that is whose jaws are easily removable and replaceable, but, always perfectly positioned.

SUMMARY OF THE INVENTION

A chuck has according to the invention a chuck body rotatable about a chuck axis, a plurality of holders angularly spaced about and radially displaceable on the body and each formed with an outwardly flared seat centered on a respective seat axis, and an actuator for radially displacing the holders on the body. Respective jaws on the holders each have an inwardly tapered stem complementary to and engaged snugly in the respective seat. Respective locking elements in the holders are each displaceable into a locking position securing the respective stem in the respective seat.

According to the invention the stem is tubular and has a generally frustoconical outer surface. It can correspond to standard collet structure and taper. By appropriate provisions of flats in the seat and on the stem, the jaw will be properly angularly oriented on the chuck.

For fastest possible jaw change, the locking elements include a pair of pawls in each of the holders displaceable radially of the respective seat axis. Respective screws in the holders extending generally diametrally of the respective seat axis each have a right-hand screw thread engaged with one of the respective pawls and a left-hand screw thread engaged with the other of the respective pawls so that rotation of the screws in one direction displaces the respective pawls toward each other and into the locking position and opposite rotation displaces them apart and out of the locking position.

According to another feature of the invention the stem is solid and has a generally frustoconical outer surface. In this case the locking elements include a pair of pincer-type grippers in each of the holders engageable with the respective stem.

For centrally controlled operation the actuator is hydraulic, that is a double-acting piston in each holder can be shifted to lock or unlock the respective stem. In this manner all the jaws can be locked or released at one time.

The holders can be radially shiftable on the chuck body, and the actuator can include a membrane plate connected to the holders.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
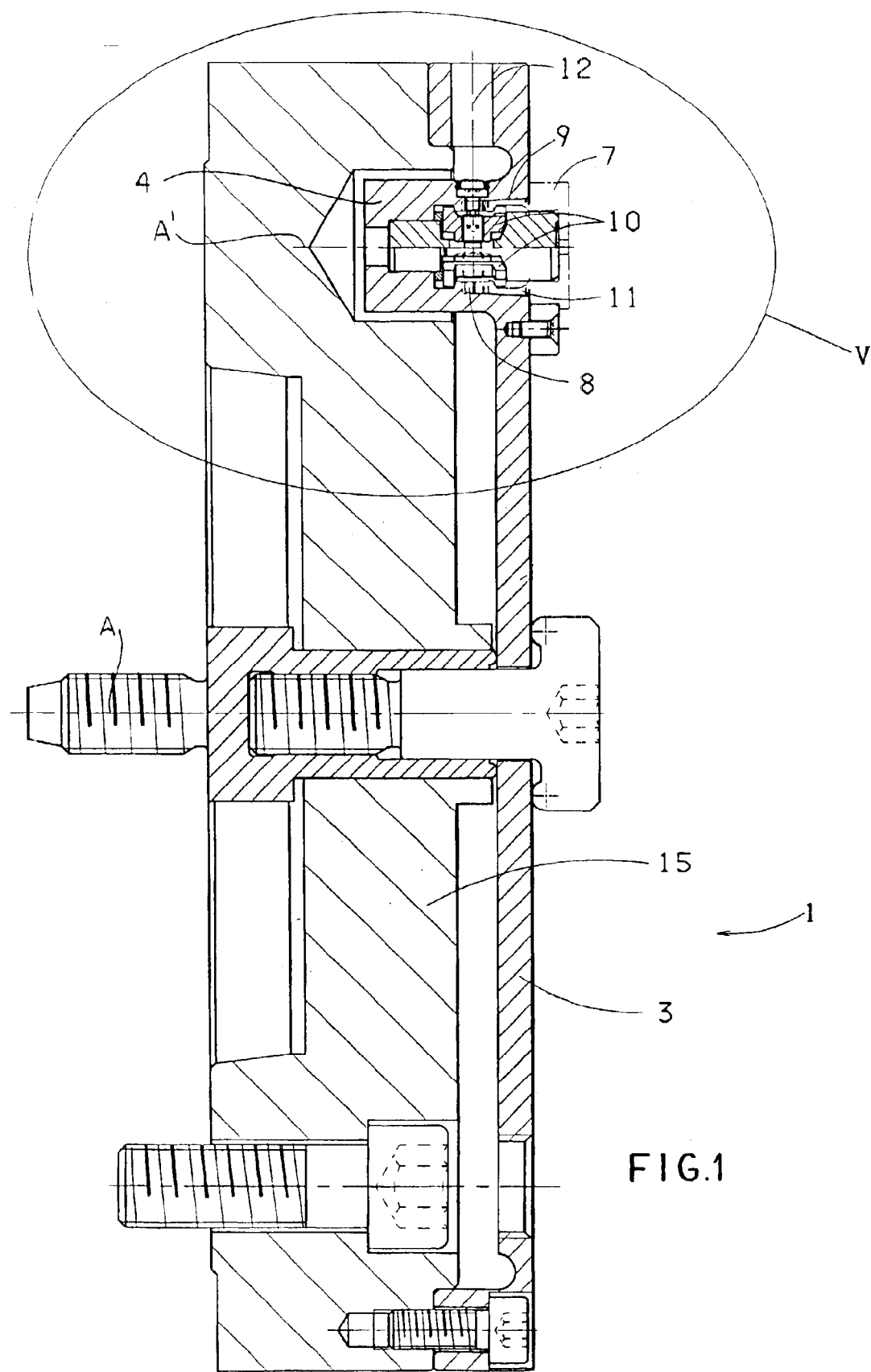
FIG. 1 is an axial section through a membrane-type lathe chuck according to the invention.
Figure 5:
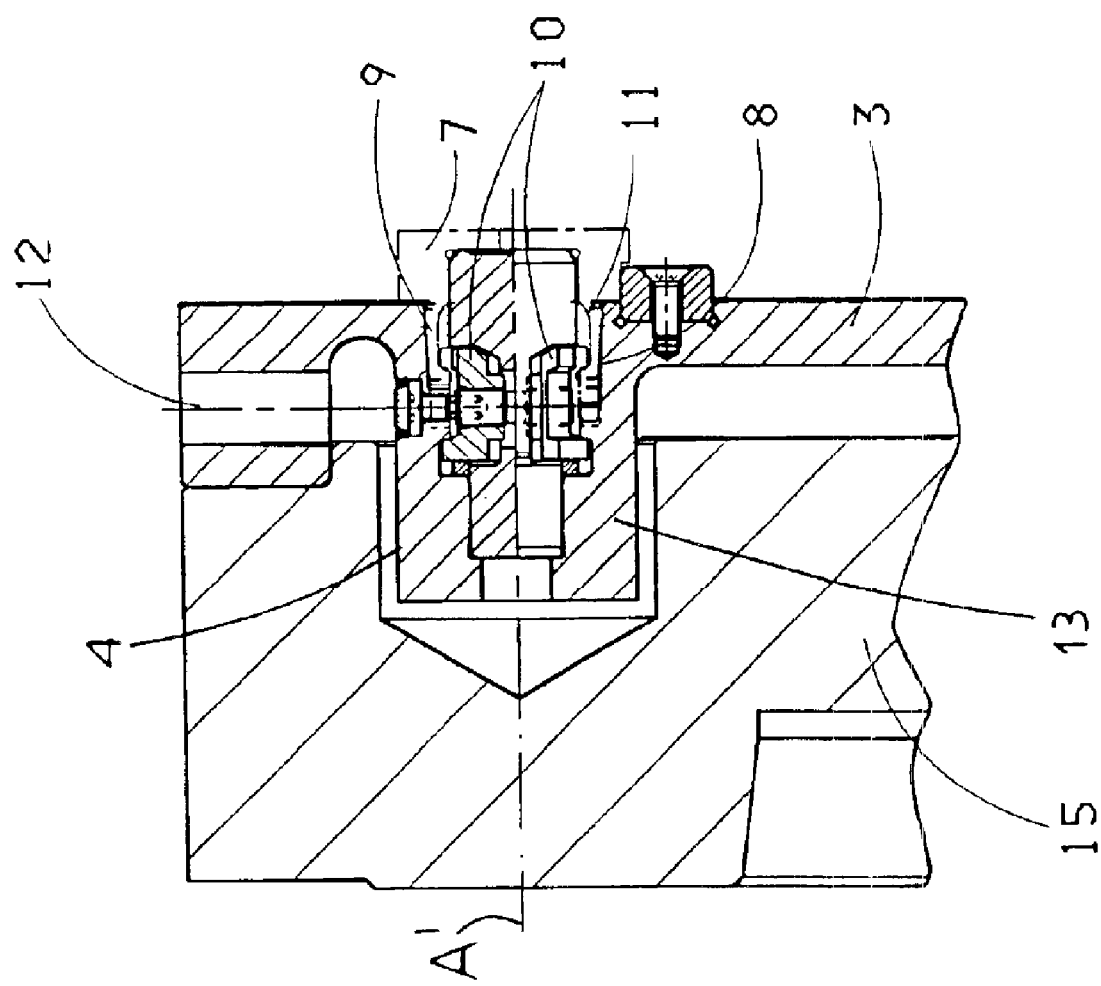
FIG. 5 is a large-scale view of the detail indicated at V in FIG. 1.

As seen in FIGS. 1 and 5 a chuck 1 according to the invention has a bass body 15 centered on and rotatable about a chuck axis A and a so-called membrane plate 3 extending perpendicular to the axis A and formed unitarily with a plurality of holders 4 each in turn forming an axially outwardly flaring frustoconical seat 8 centered on a seat axis A'. Deformation of the plate 3 shifts the holders 4 radially relative to the chuck axis A. Respective removable jaws 7 have axially inwardly tapering and tubular frustoconical stems 9 that fit comlementarily in the seats 8 and that are secured therein by locking elements or pawls 10.

More particularly, the pawls 10 can be moved radially of the respective axis A' toward and away from each other by a double-threaded screw 11 having a right-hand thread engaged in one of the pawls 10 and a left-hand thread engaged in the other pawl 10 so that, when turned in one direction by a tool inserted through a radial hole 12 in the body 15, the pawls 10 are drawn together into a locking position and clamp the end of the stem 9 in the seat 8, and when oppositely rotated they move apart and release the stem 9.

Figure 2:
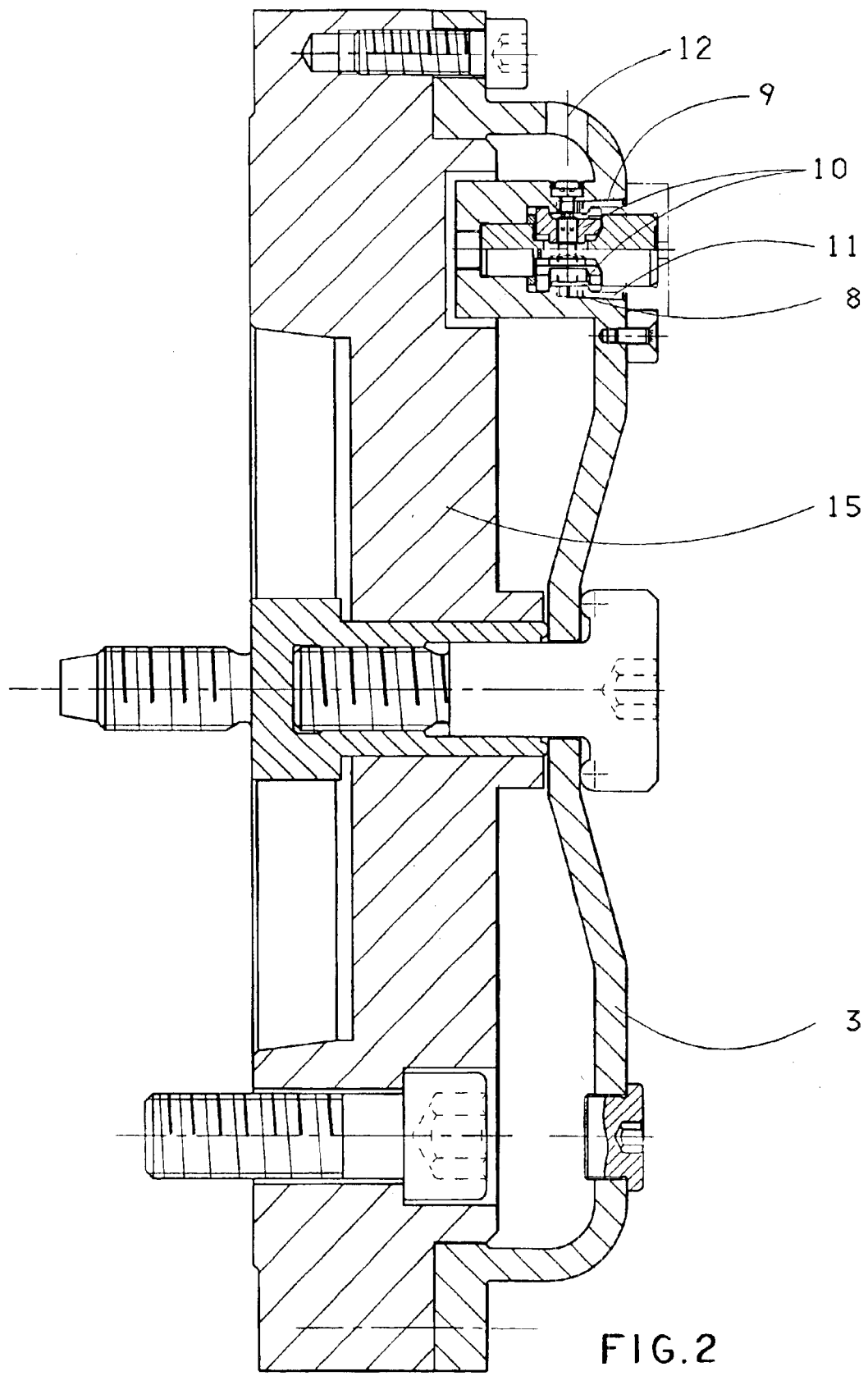
FIG. 2 is a view like FIG. 1 of a membrane-type chuck with particularly short jaws.

FIG. 2 shows a similar system, but the membrane plate 3 is not planar and the holes 12 are formed in it, not in the body 15.

Figure 3:
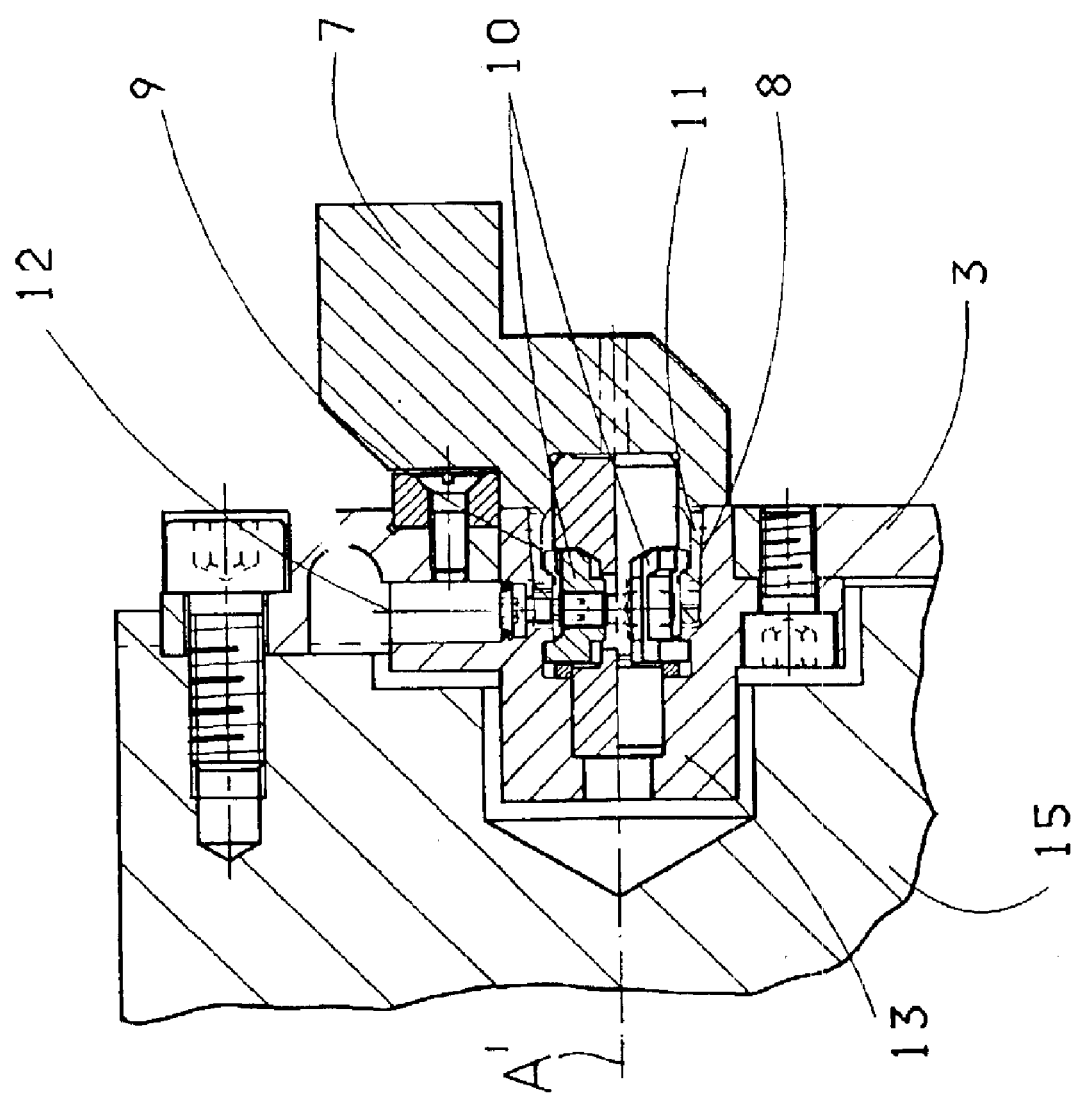
FIG. 3 is a detail view of a membrane-type chuck with jaw mounts fixed internally to the membrane.
Figure 4:
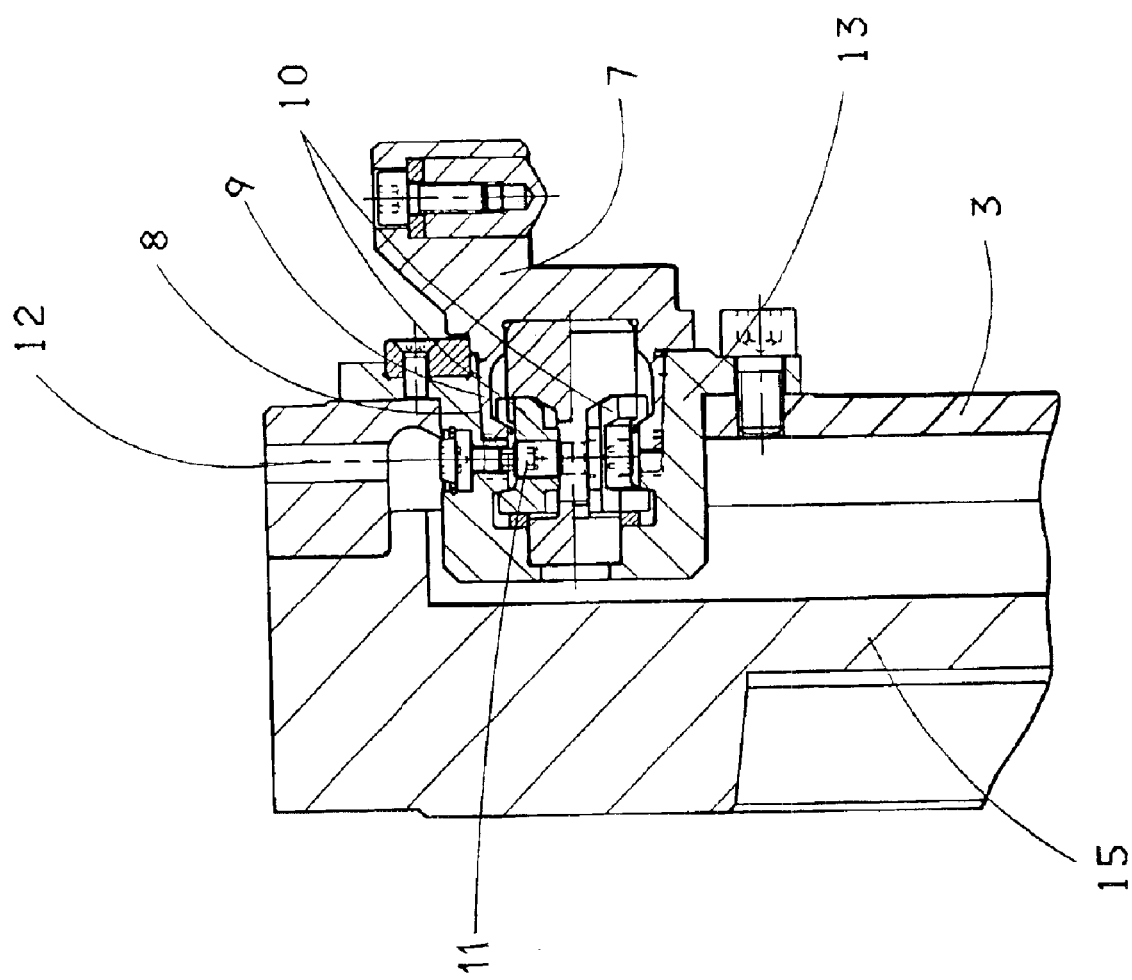
FIG. 4 is a detail view of a membrane-type chuck with jaw mounts fixed externally to the membrane.

In FIGS. 3 and 4 separate holders 13 forming the seats 8 are bolted to the membrane plate 3 and once again the holes 12 are formed in the outer periphery of the plate 3 that is attached to the body 15.

Figure 6:
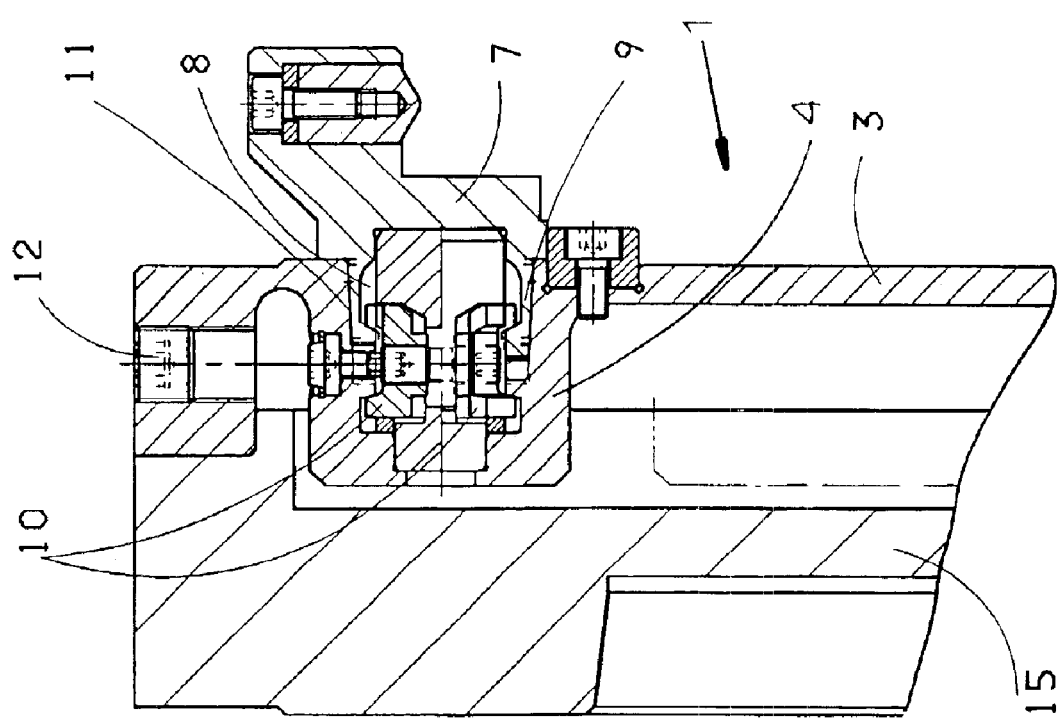
FIG. 6 is a detail of a membrane-type chuck with integral jaw mounts.
Figure 7:
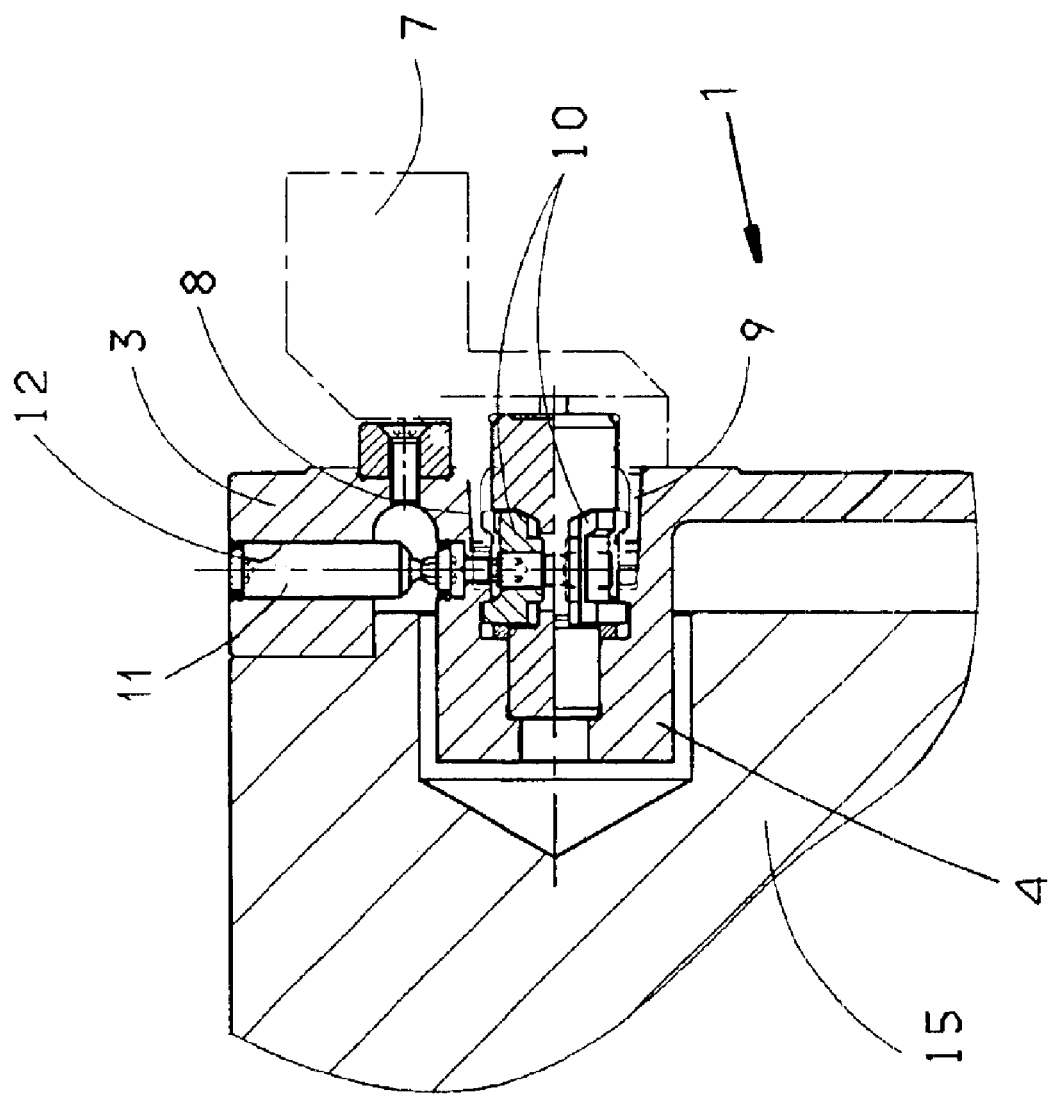
FIG. 7 is a view like FIG. 6 with a jaw-locking system extended to an outer periphery of the chuck.

FIGS. 6 and 7 show integral holders 4 with radially outwardly offset jaws 7 and in FIG. 7 the screw 11 extends all the way to the outer periphery of the body 15.

Figure 8:
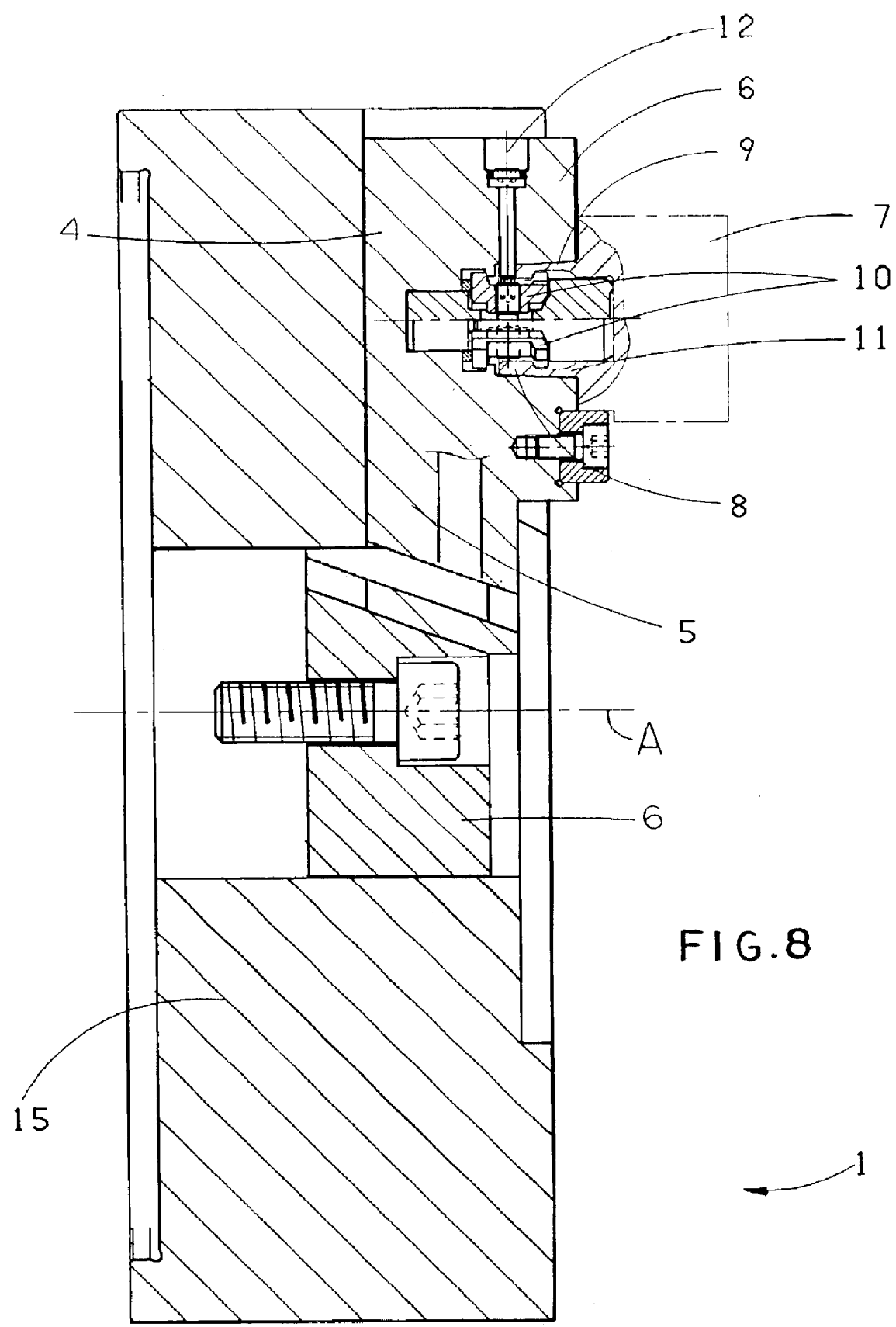
FIG. 8 is an axial section through a lathe chuck with wedge actuation.
Figure 9:
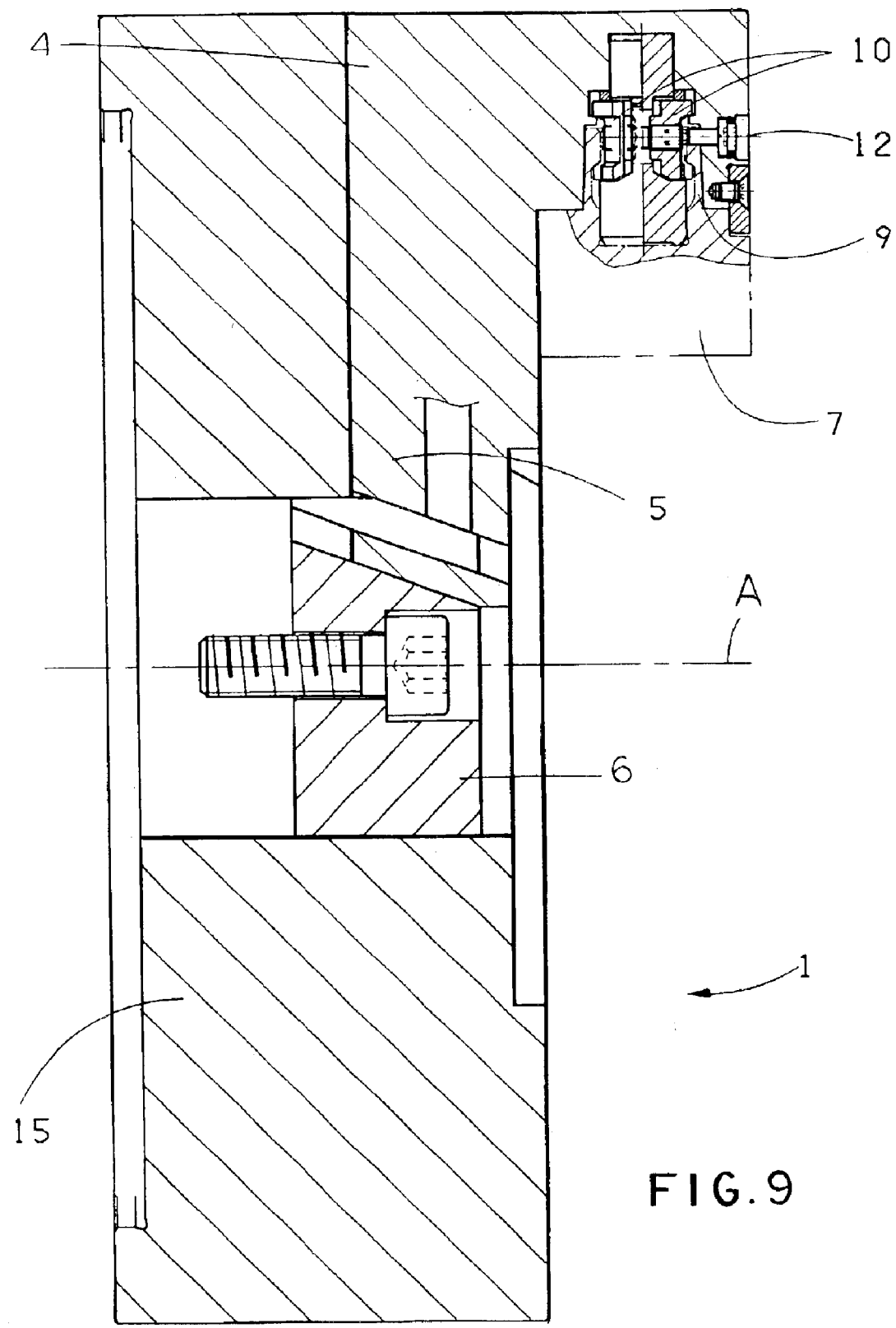
FIG. 9 is a view like FIG. 8 of another lathe chuck with wedge actuation.

The system of FIGS. 8 and 9 has holders 4 radially displaceable in guides 5 of the body 15. Here the actuating means is not a membrane plate 3, but an axially shiftable body 6 that interfits with angled surfaces of the holders 4 so that, when displaced along the axis A in one direction is radially spreads the holders 4 and when oppositely displaced is shifts them radially inward.

Figure 10:
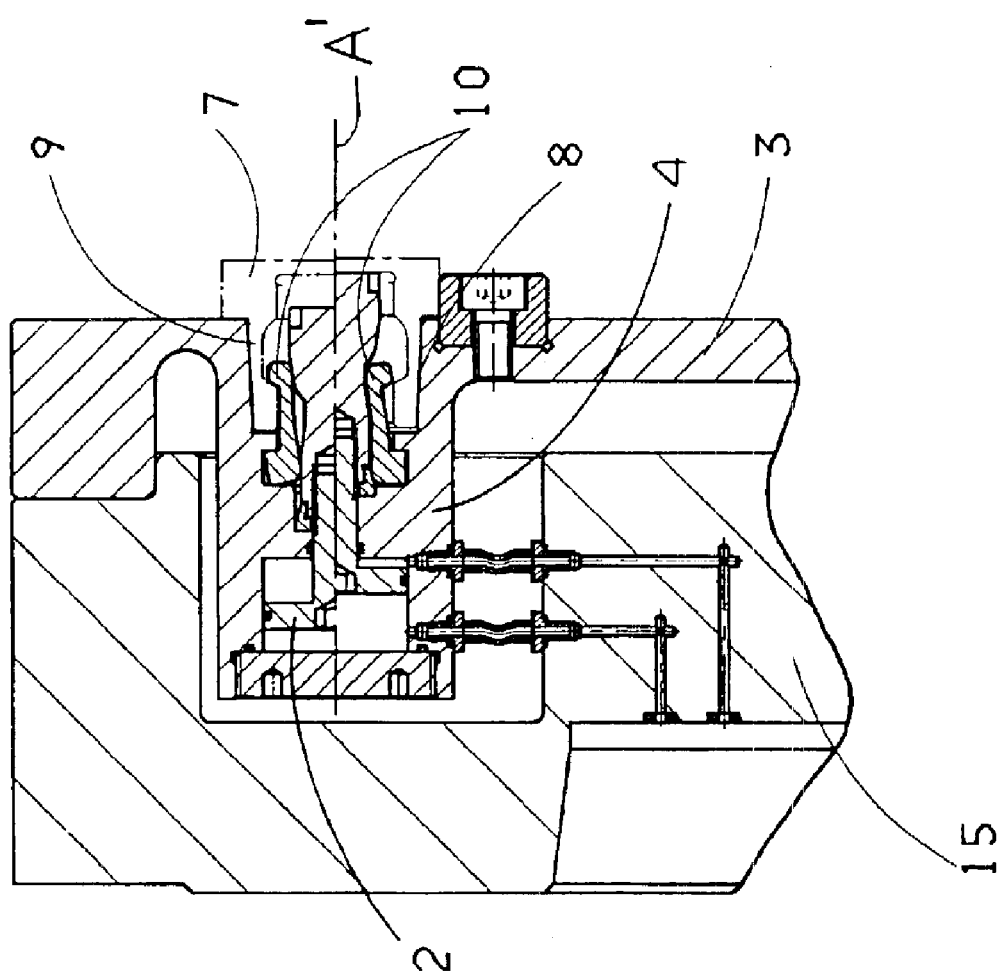
FIGS. 10 and 11 are detail views of chucks according to the invention with power actuation.
Figure 11:
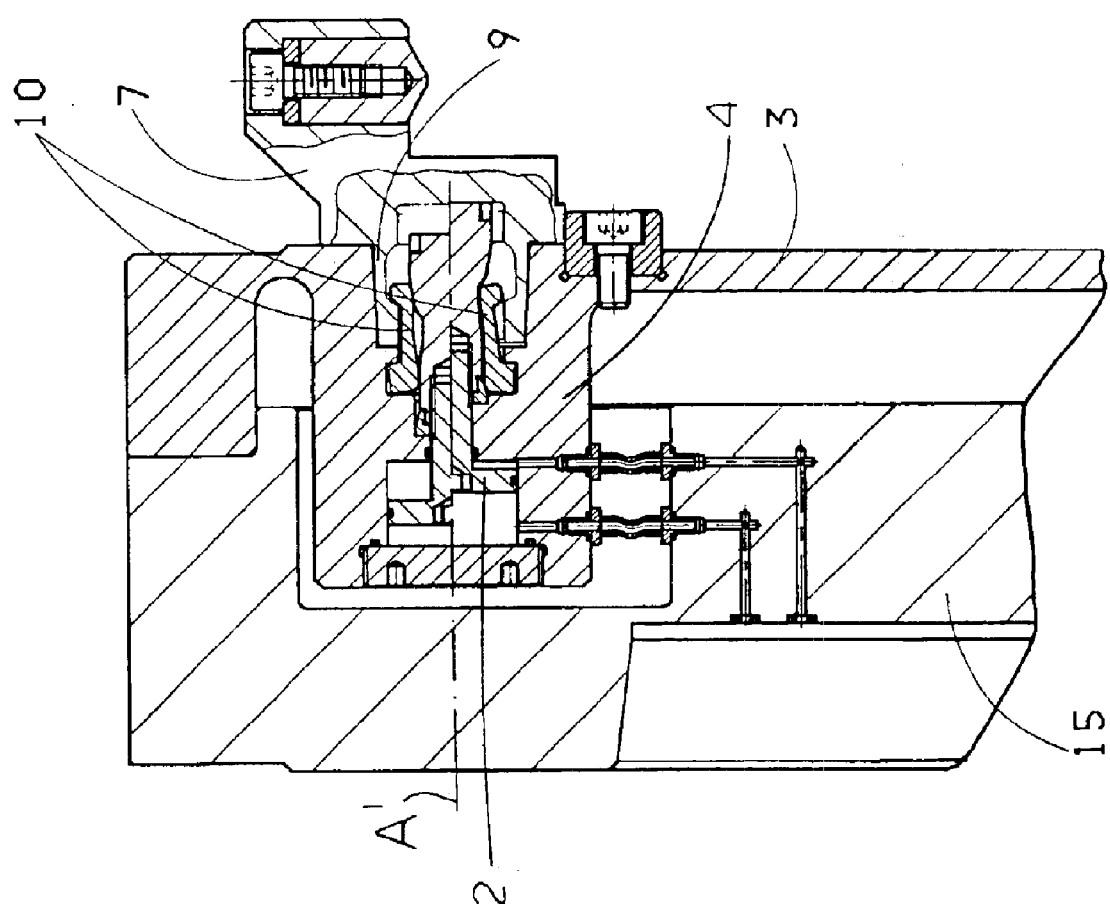

The membrane chucks of FIGS. 10 and 11 are set up for hydraulic, not manual, actuation. To this end the pawls 10 are engaged by a piston 2 that is shiftable along the respective axis A' in the holder 4. The pistons 2 are shown in the locking position in which they tip the respective pawls 10 into locking engagement with the stem 9 above the respective axes A', and in the unlocking position below the axes A'.

Figure 12:
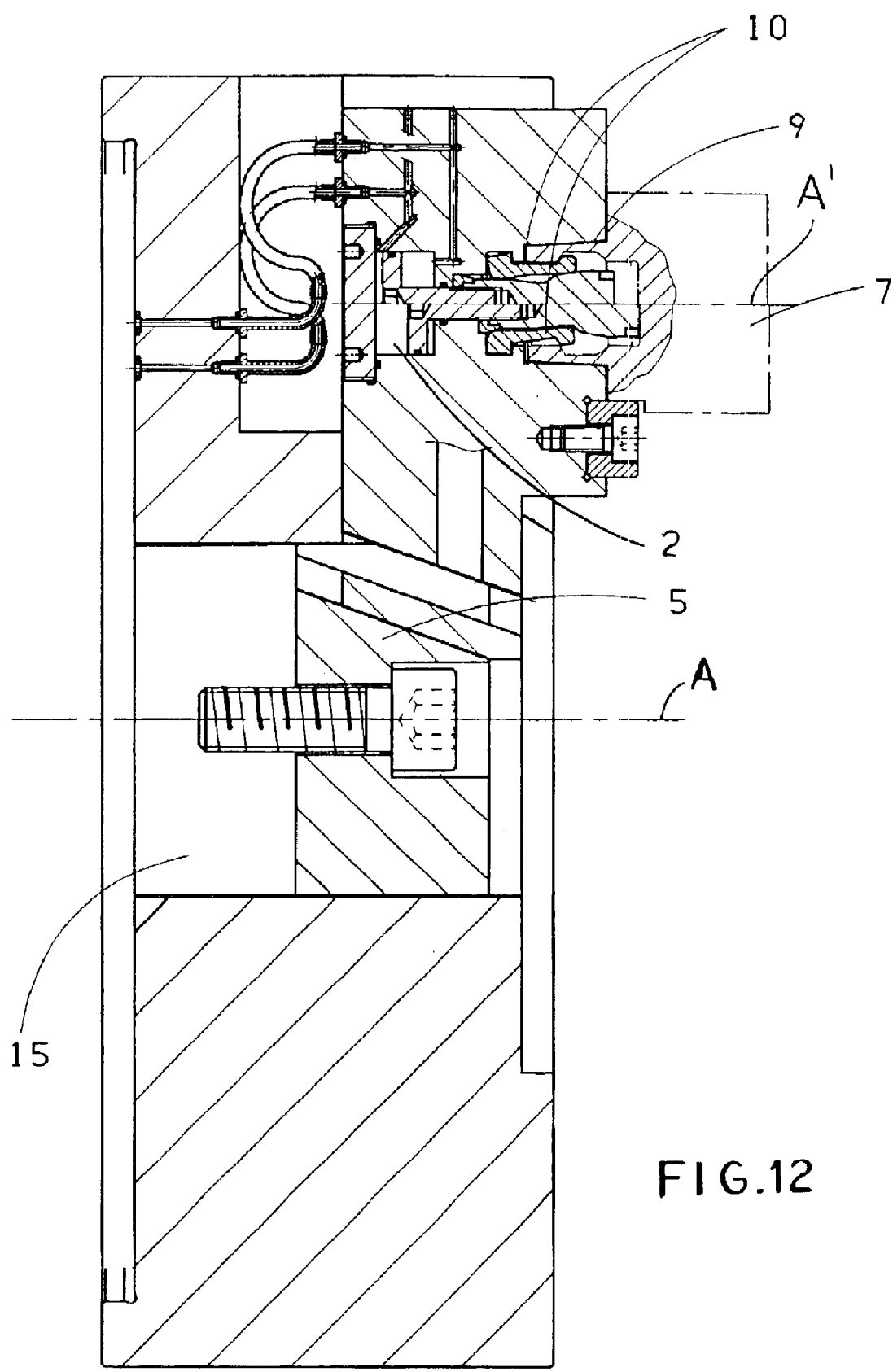
FIGS. 12 and 13 are axial sections through further chucks with power actuation.
Figure 13:
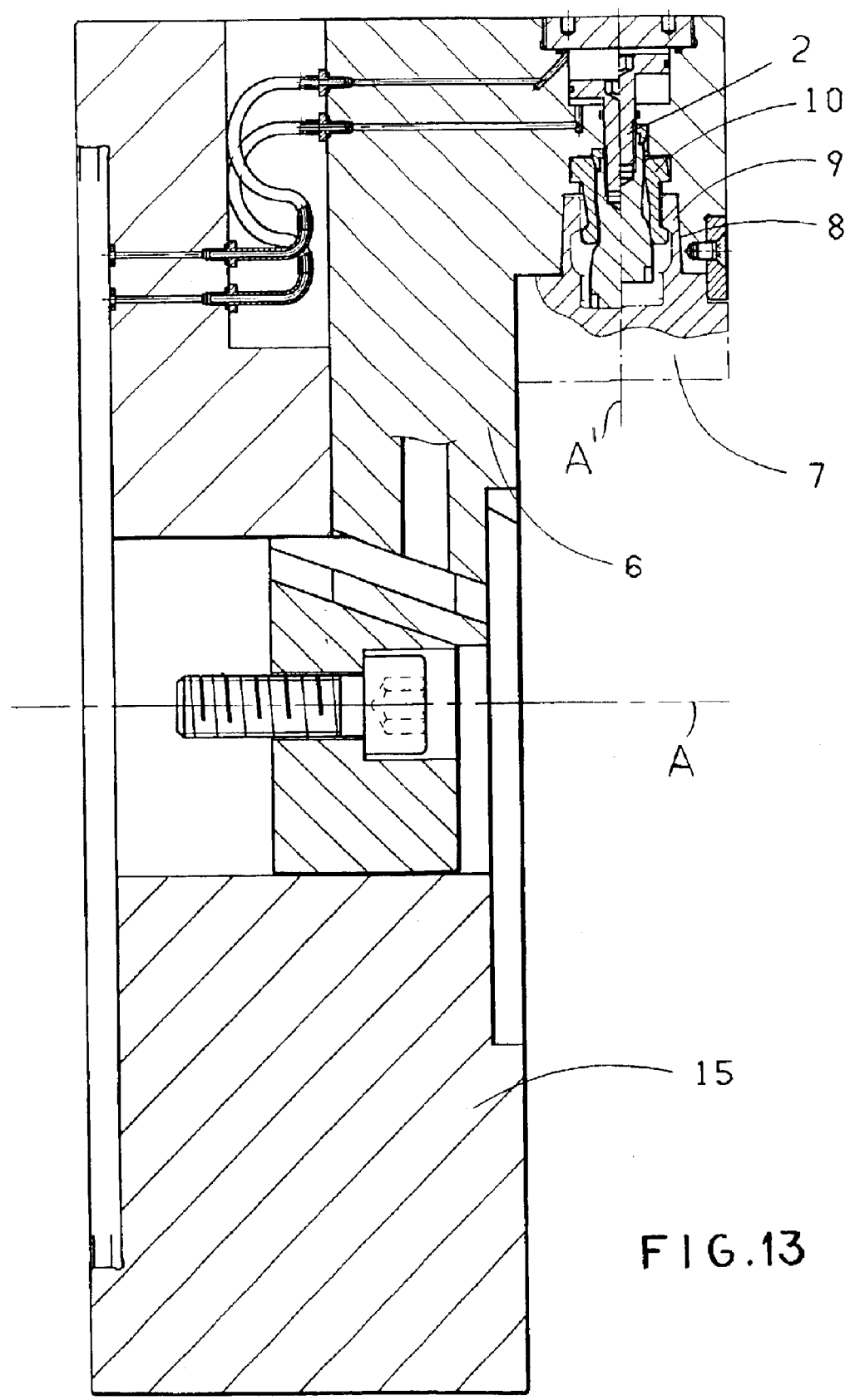

In FIGS. 12 and 13 the stems 9 are not tubular, but are cylindrical and in fact formed like DIN-standard collets. They are grippable by the pawls 10 operated by pistons 2. In FIG. 10 the axis A' is parallel to the axis A, and in FIG. 11 the axis A' is perpendicular to and intersects the axis A.

Figure 14:
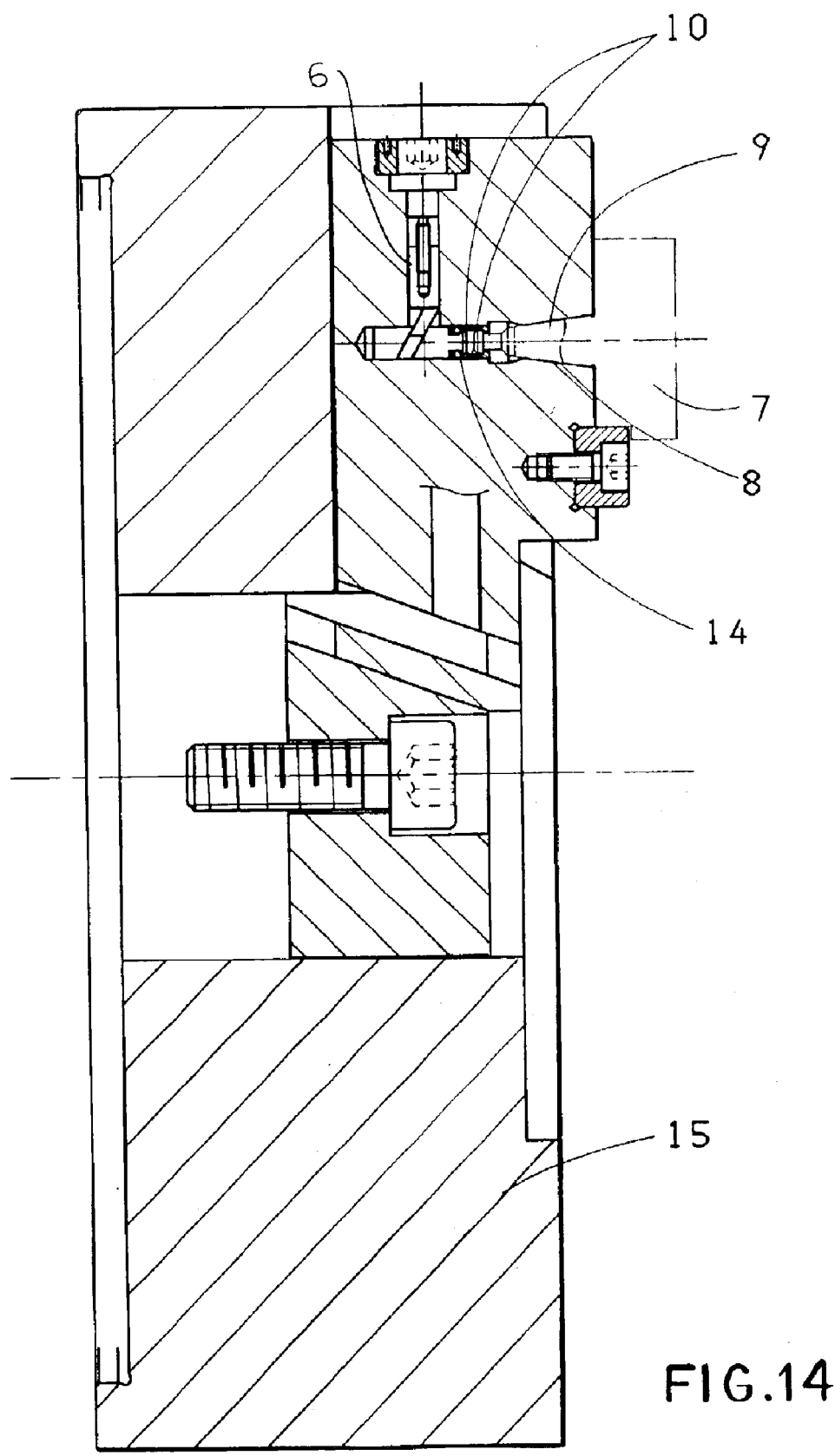
FIG. 14 is a view like FIG. 1 of a chuck in accordance with the invention with manual jaw locking.
Figure 15:
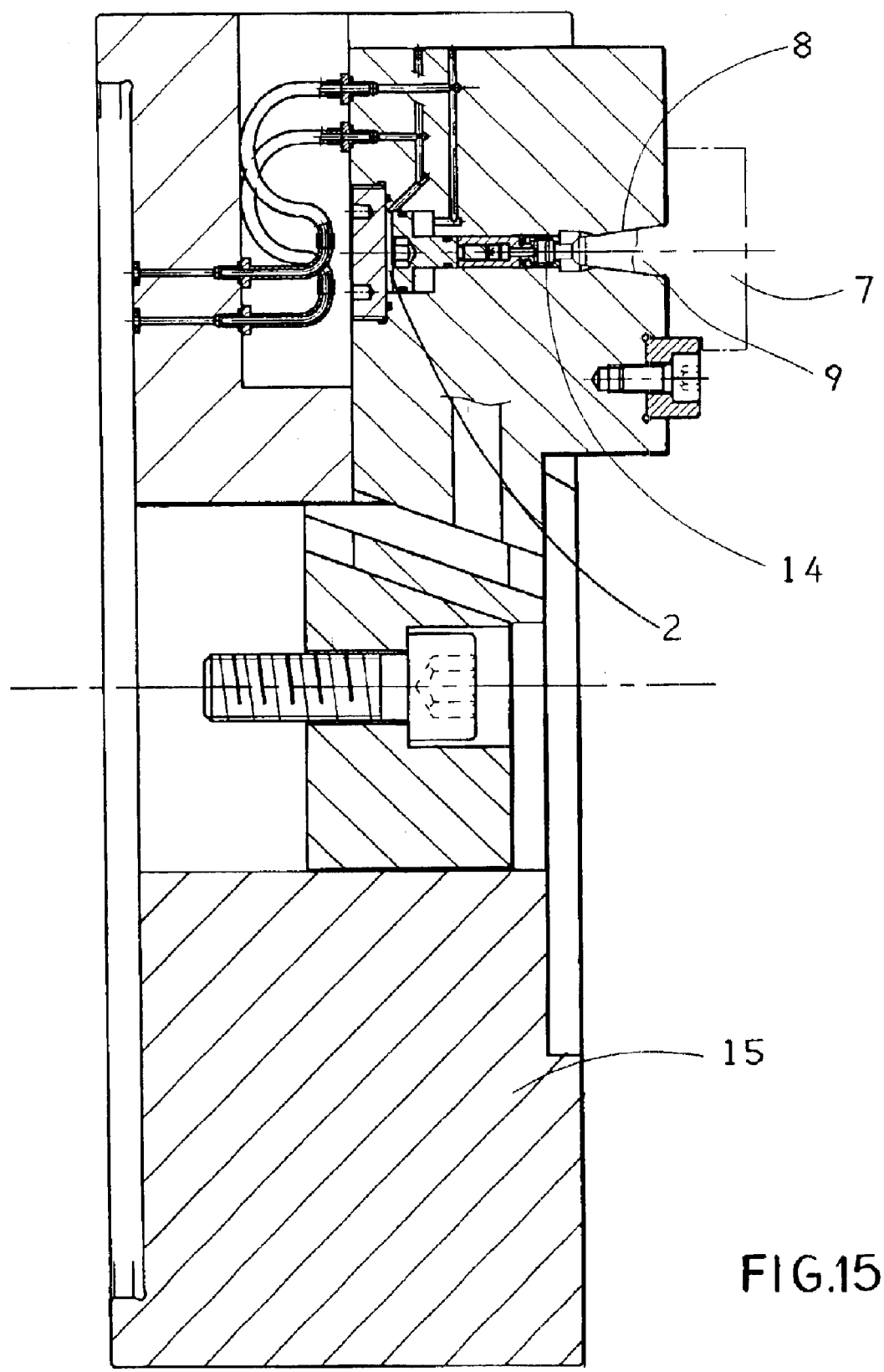
FIGS. 15, 16, and 17 are views like FIG. 1 of chucks according to the invention with various hydraulic jaw-locking systems.
Figure 16:
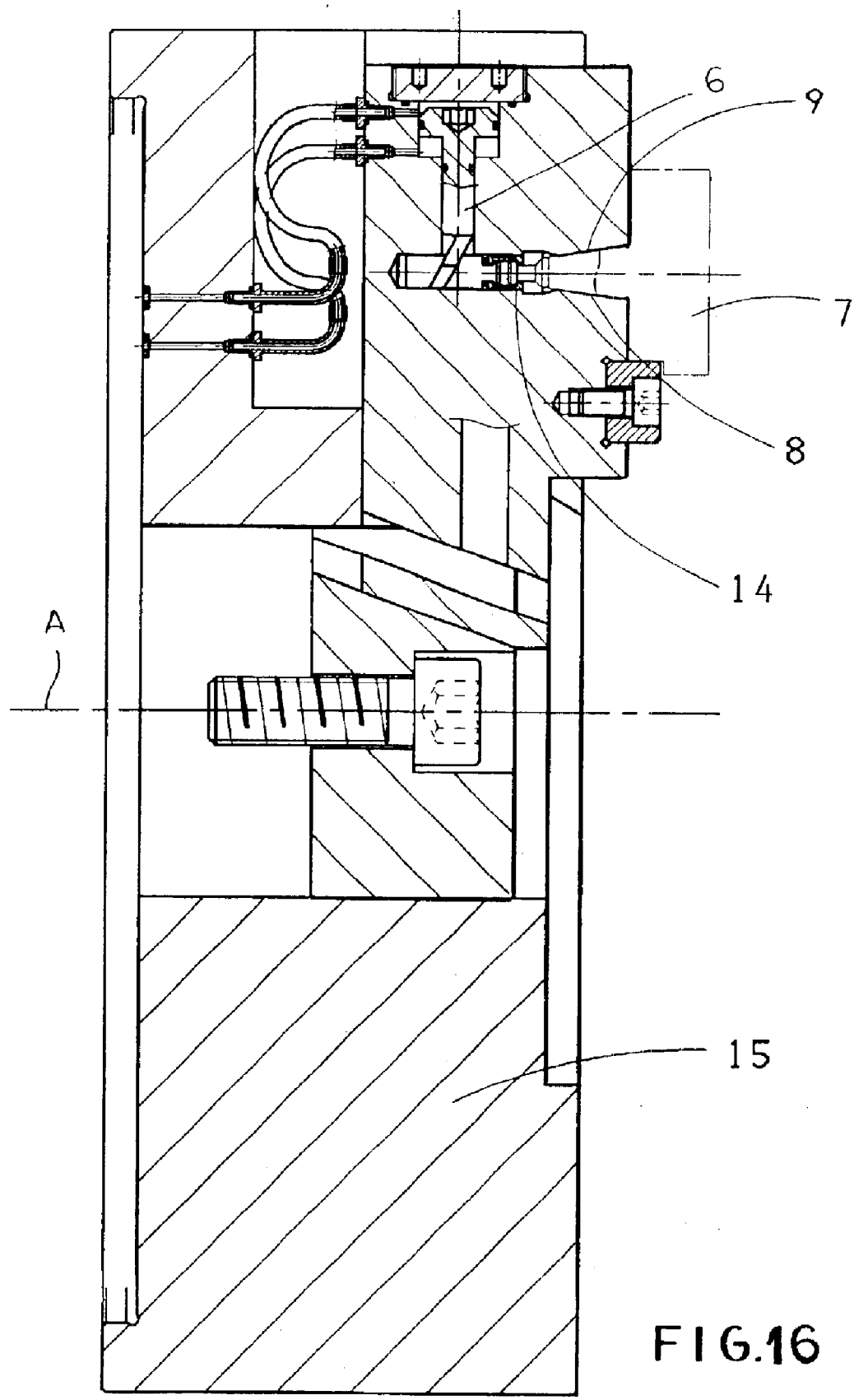
Figure 17:
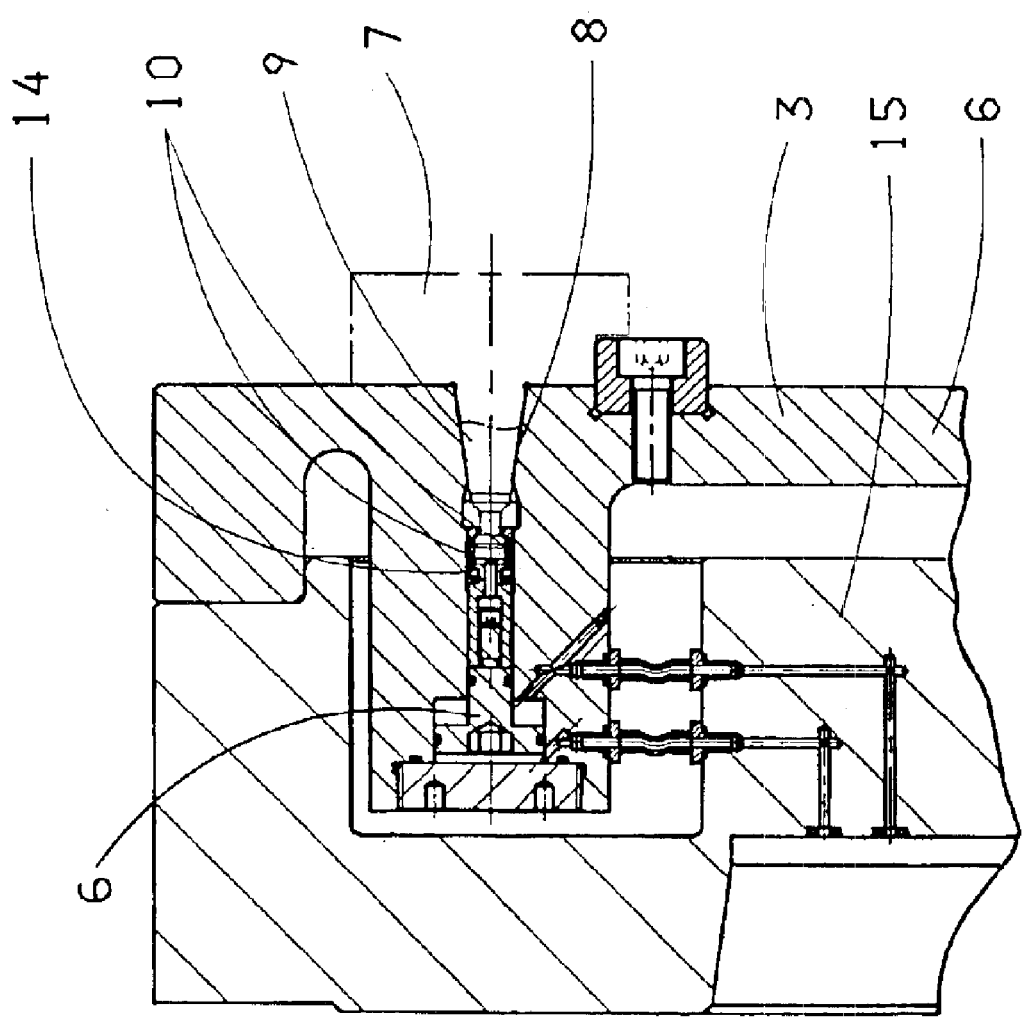

FIGS. 14 and 15 show chucks using solid rod-like stems 9 engaged between pincer-type jaw elements 14. In FIG. 14 the elements 14 are locked on the stem 9 by an element 6 manually shiftable radially of the axis A and in FIG. 15 a piston 2 shiftable parallel to the axis A is used. FIG. 16 has a hydraulically shiftable element 6 that extends perpendicular to the axis A and in FIG. 17 it can move parallel thereto.

I claim:

1. A chuck comprising:

a chuck body rotatable about a chuck axis;

a plurality of holders angularly spaced about and radially displaceable on the body and each formed with an outwardly flared seat centered on a respective seat axis;

actuating means for radially displacing the holders on the body;

respective jaws on the holders and each having an inwardly tapered stem complementary to and engaged snugly in the respective seat, the stem being tubular and having a generally frustoconical outer surface; and respective locking elements in the holders each displaceable into a locking position securing the respective stem in the respective seat.

2. The chuck defined in claim 1 wherein the locking elements include a pair of pawls in each of the holders displaceable radially of the respective seat axis.

3. A chuck comprising:

a chuck body rotatable about a chuck axis;

a plurality of holders angularly spaced about and radially displaceable on the body and each formed with an outwardly flared seat centered on a respective seat axis;

actuating means for radially displacing the holders on the body;

respective jaws on the holders and each having an inwardly tapered stem complementary to and engaged snugly in the respective seat;

respective pairs of pawls in each of the holders each displaceable radially of the respective seat axis into a locking position securing the respective stem in the respective seat; and respective screws in the holders extending generally diametrally of the respective seat axis and each having a right-hand screw thread engaged with one of the respective pawls and a left-hand screw thread engaged with the other of the respective pawls, whereby rotation of the screws in one direction displaces the respective pawls toward each other and into the locking position and opposite rotation displaces them apart and out of the locking position.

4. The chuck defined in claim 3 wherein the stem is solid and has a generally frustoconical outer surface.

5. A chuck comprising:

a chuck body rotatable about a chuck axis;

a plurality of holders angularly spaced about and radially displaceable on the body and each formed with an outwardly flared seat centered on a respective seat axis;

actuating means for radially displacing the holders on the body;

respective jaws on the holders and each having an inwardly tapered stem complementary to and engaged snugly in the respective seat; and a respective pair of grippers in each of the holders engageable with the respective stem and displaceable into a locking position securing the respective stem in the respective seat.

6. The chuck defined in claim 5 wherein the actuating means is hydraulic.

7. The chuck defined in claim 5 wherein the actuating means includes a membrane plate connected to the holders.

* * * * *